(12) United States Patent
Ueda

(10) Patent No.: US 9,482,293 B2
(45) Date of Patent: Nov. 1, 2016

(54) ELECTROMAGNETIC CLUTCH

(71) Applicant: DENSO CORPORATION, Kariya-shi, Aichi (JP)

(72) Inventor: Motohiko Ueda, Okazaki (JP)

(73) Assignee: DENSO CORPORATION, Kariya (JP)

( * ) Notice: Subject to any disclaimer, the term of this patent is extended or adjusted under 35 U.S.C. 154(b) by 130 days.

(21) Appl. No.: 14/384,987

(22) PCT Filed: Sep. 18, 2012

(86) PCT No.: PCT/JP2012/073854
§ 371 (c)(1),
(2) Date: Sep. 12, 2014

(87) PCT Pub. No.: WO2013/136560
PCT Pub. Date: Sep. 19, 2013

(65) Prior Publication Data
US 2015/0034448 A1 Feb. 5, 2015

(30) Foreign Application Priority Data
Mar. 14, 2012 (JP) .................... 2012-057601

(51) Int. Cl.
*F16D 27/04* (2006.01)
*F16D 27/112* (2006.01)
(Continued)

(52) U.S. Cl.
CPC .............. *F16D 27/04* (2013.01); *F16D 13/24* (2013.01); *F16D 27/112* (2013.01); *F16D 2027/001* (2013.01); *F16D 2027/002* (2013.01); *F16D 2027/005* (2013.01)

(58) Field of Classification Search
CPC ........ F16D 27/04; F16D 27/08; F16D 27/14; F16D 27/112; F16D 2027/001; F16D 2027/002; F16D 2027/005
See application file for complete search history.

(56) References Cited

U.S. PATENT DOCUMENTS

| 4,428,470 A | 1/1984 | Bennett et al. |
| 5,119,918 A | 6/1992 | Pardee |

(Continued)

FOREIGN PATENT DOCUMENTS

| JP | U-54-108852 | 7/1979 |
| JP | B2-63-3176 | 1/1988 |

(Continued)

OTHER PUBLICATIONS

Jun. 2, 2015 Office Action issued in Japanese Patent Application No. 2012-057601.

(Continued)

*Primary Examiner* — Huan Le
(74) *Attorney, Agent, or Firm* — Oliff PLC

(57) ABSTRACT

An electromagnetic clutch is provided with: a rotor which has a friction plate; a stator which has an electromagnetic coil; and an armature which is attracted to the friction plate by electromagnetic attraction force generated by the conduction of electricity to the electromagnetic coil. The electromagnetic coil includes electromagnetic coils. The electromagnetic clutch is also provided with a circuit switching section which is configured in such a manner that, when a switch-on command is outputted, the circuit switching section allows an electric current to flow in parallel into the electromagnetic coils, and then, after the armature is attracted to the friction plate, the circuit switching section switches a circuit for conducting electricity to the electromagnetic coil, from a parallel circuit to a series circuit so that an electric current flows in series into the electromagnetic coils.

5 Claims, 11 Drawing Sheets

(51) Int. Cl.
  *F16D 13/24* (2006.01)
  *F16D 27/00* (2006.01)

(56) References Cited

U.S. PATENT DOCUMENTS

| | | | | |
|---|---|---|---|---|
| 5,159,522 | A | * | 10/1992 | Gray .................. F16D 27/04 |
| | | | | 192/84.2 |
| 2005/0269183 | A1 | | 12/2005 | Ohtsuka et al. |
| 2006/0249348 | A1 | * | 11/2006 | Poy .................. F16D 27/112 |
| | | | | 192/84.2 |

FOREIGN PATENT DOCUMENTS

| JP | A-4-228932 | 8/1992 |
|---|---|---|
| JP | A-7-190095 | 7/1995 |
| JP | U-7-44360 | 11/1995 |
| JP | A-2000-344431 | 12/2000 |
| JP | A-2004-92857 | 3/2004 |
| JP | A-2005-344876 | 12/2005 |
| JP | A-2006-313017 | 11/2006 |
| JP | A-2006-342937 | 12/2006 |

OTHER PUBLICATIONS

Aug. 19, 2015 Office Action issued in Korean Patent Application No. 10-2014-7025498.
Dec. 4, 2015 Office Action issued in Chinese Patent Application No. 201280071394.9.
International Search Report issued in International Application No. PCT/JP2012/073854 mailed Nov. 13, 2012.
Written Opinion issued in International Application No. PCT/JP2012/073854 mailed on Nov. 13, 2012.

\* cited by examiner

FRONT ←——→ BACK

FRONT ←――――――→ BACK

ELECTROMAGNETIC CLUTCH

TECHNICAL FIELD

The present invention relates to an electromagnetic clutch which uses electromagnetic force to attract an armature to a rotor and transmit drive force to the rotor.

BACKGROUND ART

As this type of electromagnetic clutch, there is known an electromagnetic clutch which provides a friction plate of a rotor with three rows of grooves in the radial direction, provides the armature which faces the friction plate with two grooves in the radial direction, and makes the number of poles between the rotor and armature six poles (for example, see PLT 1). The "number of poles" is the number of pole parts which are formed between the rotor (friction plate) and the armature and corresponds to the number of locations where the magnetic flux cuts across the air gap between the rotor and the armature.

CITATIONS LIST

Patent Literature

PLT 1: Japanese Patent Publication No. 7-190095A

When the number of poles is six poles compared with four poles, an electromagnetic clutch can generate a high transmission torque. However, if the number of poles increases, the path of the magnetic flux which cuts across the air gap between the rotor and armature becomes longer. For this reason, the electromagnetic attraction force at the time of starting energization of the electromagnetic coil, that is, the operating attraction force for switching the electromagnetic clutch from the off state to the on state becomes small and leads to deterioration of the working performance of the electromagnetic clutch.

SUMMARY OF INVENTION

Technical Problem

The present invention, in view of the above problem, provides an electromagnetic clutch which can keep down the consumed power while can improve the working performance of the electromagnetic clutch.

Solution to Problem

To solve the above problem, the electromagnetic clutch (100) according to the present invention comprises a rotor (1) which has a friction plate (13) and which rotates about an axis (L0), a stator (2) which has an electromagnetic coil (3) which is energized and deenergized by a clutch on command and clutch off command, and an armature (4) which is attracted to the friction plate (13) by an electromagnetic attraction force which is generated by energization of the electromagnetic coil (3). The electromagnetic coil (3) includes a plurality of electromagnetic coils (31, 32). The electromagnetic clutch (100) further comprises a circuit switching part (30, 35; 70) for switching an energization circuit of the electromagnetic coil (3) from a parallel circuit to a serial circuit so that when a clutch on command is output, current flows in parallel to the plurality of electromagnetic coils (31, 32) and then later when the armature (4) is attracted to the friction plate (13), current flows in series to the plurality of electromagnetic coils (31, 32).

Due to this, when a clutch on command is output, current flows in parallel to the plurality of electromagnetic coils, so a large electromagnetic attraction force is generated between the rotor and armature and the working performance of the electromagnetic clutch when the electromagnetic clutch is switched from the off state to the on state can be improved. If the armature is attracted to the friction plate after that, current flows in series to the plurality of electromagnetic coils, so it is possible to keep a larger current than necessary from flowing to the electromagnetic coil and to keep down the consumed power of the electromagnetic coil.

Note that, the above reference notations show one example of the correspondence with the specific embodiments which are described in the later explained embodiments.

DESCRIPTION OF EMBODIMENTS

First Embodiment

Below, referring to FIG. 1 to FIG. 8, a first embodiment of an electromagnetic clutch according to the present invention will be explained. The electromagnetic clutch is a dry type single plate clutch which uses an electromagnetic force which is generated by energization of an electromagnetic coil to transmit and cut off power from a rotary drive source. Below, as one example, an electromagnetic clutch which transmits power from an engine to a compressor of an automotive air-conditioning system (refrigerant compressor) and cuts off the transmission of power to the compressor will be explained.

Figure 1:
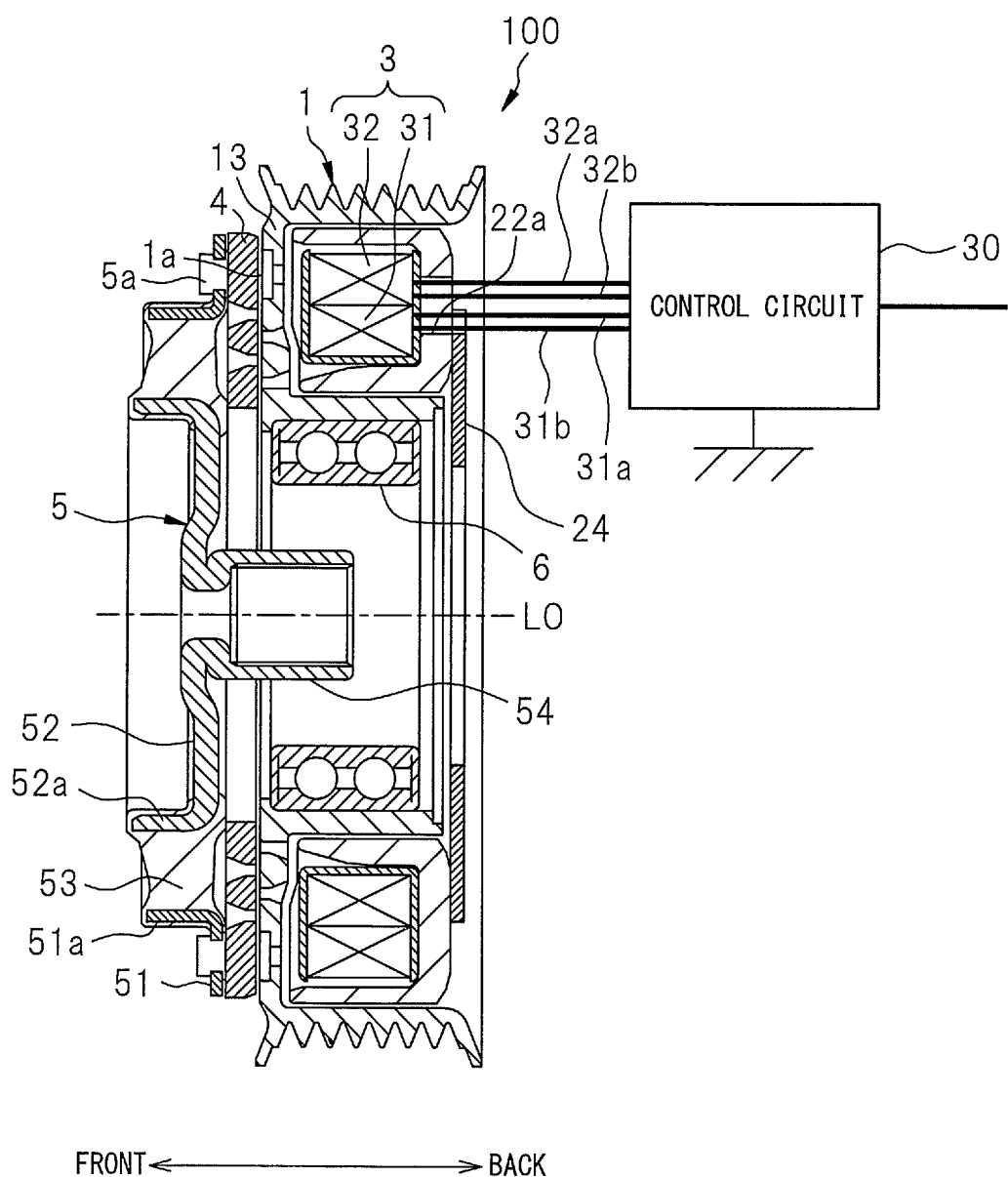
FIG. 1 is a side view which shows an overall configuration of an electromagnetic clutch according to a first embodiment of the present invention.
Figure 2:
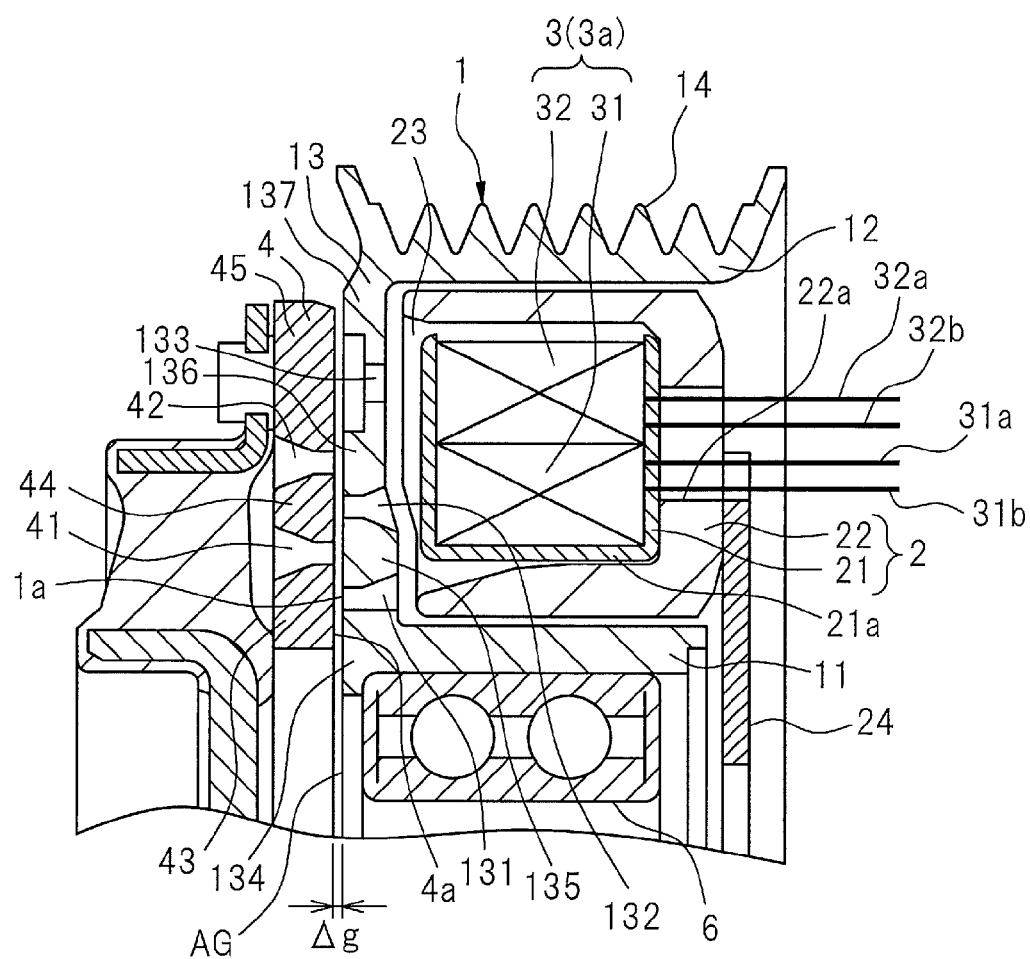
FIG. 2 is an enlarged view of principal parts of FIG. 1 and shows an electromagnetic clutch off state.
Figure 3:
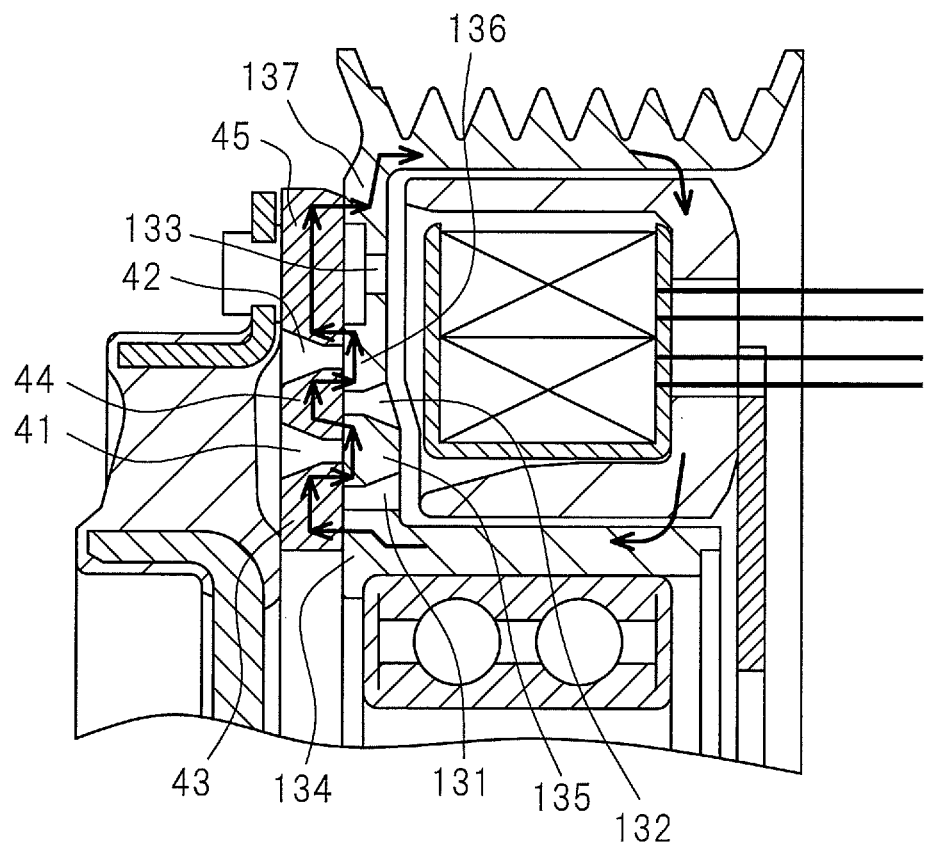
FIG. 3 is an enlarged view of principal parts of FIG. 1 and shows an electromagnetic clutch on state.

FIG. 1 is a side view which shows the overall configuration of an electromagnetic clutch 100 according to the present embodiment (partial cross-sectional view), while FIGS. 2 and 3 are enlarged views of principal parts of FIG. 1. Note that, FIGS. 1 and 2 show the off state of an electromagnetic clutch 100 which cuts off the transmission of power from the engine, while FIG. 3 shows the on state of the electromagnetic clutch 100 which transmits power from the engine.

As shown in FIG. 1, the electromagnetic clutch 100 is provided with a rotor 1 which is driven to rotate by a not shown drive source constituted by a vehicle engine and which rotates about an axis L0, a stator 2 which has an electromagnetic coil 3, an armature 4 which is attracted to an end face (friction face 1a) of a friction plate 13 of the rotor 1 by electromagnetic force which is generated by energization of the electromagnetic coil 3, and a hub 5 which transmits rotary power to the compressor (not shown). Note that, below, for convenience, the direction along the axis L0 is defined as the "front-back direction", the direction perpendicular to the axis L0 and extending in the radial state is defined as the "radial direction", and the direction along the circumference of a circle centered on the axis L0 is defined as the "circumferential direction". The configuration of the parts will be explained in accordance with these definitions. The compressor is arranged behind the electromagnetic clutch 100.

The rotor 1 is formed from iron or another magnetic material. As shown in FIGS. 2 and 3, the rotor 1 has an inner tubular part 11 of a cylindrical shape centered about the axis L0, an outer tubular part 12 with a larger diameter than the inner tubular part 11, and a friction plate 13 which extends in the radial direction and connects the front end parts of the inner tubular part 11 and the outer tubular part 12. That is, the cross-section of the rotor 1 in the radial direction exhibits a U-shaped cross-section which is open at the back side and has a cylindrical space and the insides of the inner tubular part 11 and outer tubular part 12. In the cylindrical space of the rotor 1, the stator 2 is housed with a gap from the rotor 1. The rotor 1 can rotate about the stator 2.

The friction plate 13 has slot-shaped circular-arc parts 131 to 133 which are formed by a nonmagnetic material at three locations in the radial direction. The plurality of circular-arc parts 131 to 133 are arranged in the circumferential direction along respective virtual circles centered on the axis L0. The friction plate 13 is split into four parts in the radial direction by the circular-arc parts 131 to 133. That is, the friction plate 13 is divided, in order from the inside in the radial direction, into a first ring part 134, second ring part 135, third ring part 136, and fourth ring part 137. Note that, the circular-arc parts 131 to 133 are magnetism blocking parts. Instead of configuring these by a nonmagnetic material, they may also be configured by through holes.

At the inner circumferential surface of the cylindrical part 11 of the rotor 1, a bearing 6 is fit. The inner circumferential surface of the bearing 6 is fixed to the outer circumferential surface of the front housing of a not shown compressor. The rotor 1 is supported through the bearing 6 at the front housing to be able to rotate. At the outer circumferential surface of the outer tubular part 12 of the rotor 1, a cylindrical shape pulley 14 is integrally joined. At the outer circumferential surface of the pulley 14, multiple V-grooves 14a are formed. At the V-grooves 14a, a not shown ribbed V-belt which is driven by an engine is suspended. The rotor 1 is rotated by the rotary power of the engine which is transmitted through a V-belt.

The stator 2 has a spool 21 which supports the electromagnetic coil 3 and a housing 22 in which the spool 21 is housed. The spool 21 is molded from a plastic which has an electrical insulating property as a component material into an overall ring shape centered about the axis L0. The spool 21 exhibits a U-shaped cross-section which is open at the outside in the radial direction. At the cylindrical space at the inside of this U-part, the electromagnetic coil 3 is housed. The housing 22 is formed by iron or another magnetic material into an overall ring shape centered about the axis L0. The housing 22 exhibits a C-shaped cross-section which is open at the front side. At the cylindrical space at the inside of this C-part, the electromagnetic coil 3 and the spool 21 are housed. At the cylindrical space of the housing 22, a plastic material 23 which has an electrical insulating property is filled. Due to the plastic material 23, the electromagnetic coil 3 and the spool 21 are fixed in place. The stator 2 is supported at the front housing of the compressor through a support member 24 which is fastened to the back end part of the housing 22.

The electromagnetic coil 3 is formed in a ring shape about the axis L0 by winding a coil wire 3a around the tubular part 21a of the spool 21. In particular, in the present embodiment, the electromagnetic coil 3 has a first electromagnetic coil 31 and a second electromagnetic coil 32 which is arranged at the outside of the first electromagnetic coil 31 in the radial direction. That is, in a predetermined coil storage space which is defined by the spool 21, the electromagnetic coil 3 is arranged split into two. By arranging the electromagnetic coil 3 split into two, compared with when arranging an electromagnetic coil 3 in the same coil storage space without splitting it, the volume (number of turns) of the electromagnetic coils 31 and 32 can be reduced. The first electromagnetic coil 31 and the second electromagnetic coil 32 are the same as each other in radial direction length (difference of inside diameter and outside diameter). Note that, the radial direction length of the first electromagnetic coil 31 may be longer than or shorter than the radial direction length of the second electromagnetic coil 32.

The two end parts of the coil wire 3a of the first electromagnetic coil 31 are connected to the lead wires 31a and 31b. The two end parts of the coil wire 3a of the second electromagnetic coil 32 are connected to the lead wires 32a and 32b. At the back end part of the housing 22, a through hole 22a is formed which passes through the back end part in the front-back direction. At the through hole 22a, for example, not shown conductive terminals to which end parts of the coil wires 3a of the electromagnetic coils 31 and 32 are connected are arranged. Through the terminals, the lead wires 31a, 31b, 32a, and 32b are connected to the electromagnetic coils 31 and 32. Note that, the through hole 22a is provided on the vertical line of the axis L0 (0° phase), but it may also be provided at another phase.

The armature 4 is comprised of iron or another magnetic material. The armature 4 is a ring-shaped plate member centered about the axis L0 and has a predetermined thickness in the front-back direction. At the back end face, a friction surface 4a is formed which faces the friction surface 1a of the rotor 1. The armature 4 has slot-shaped circular-arc parts 41 and 42 which are formed by a nonmagnetic material at two locations in the radial direction facing the second ring part 135 and third ring part 136 of the friction plate 13, respectively. The plurality of circular-arc parts 41 and 42 are arranged in the circumferential direction along respective virtual circles centered on the axis L0. The armature 4 is split into three parts in the radial direction. That is, the armature 4 is divided into the first ring part 43, second ring part 44, and third ring part 45 in order from the inside in the radial direction. Note that, the circular-arc parts 41 and 42 are magnetism blocking parts. Instead of forming these by nonmagnetic materials, they may also be formed as through holes.

By providing the frictional plate 13 of the rotor 1 with circular-arc parts 131 to 133 at three locations in the radial direction and providing the armature 4 with circular-arc parts 41 and 42 at two locations in the radial direction, the rotor 1 and armature 4 face each other along the radial direction at six locations. That is, the rotor 1 and the magnetic pole parts 134 to 137 and 43 to 45 of the armature 4 face each other at the first ring part 134 and first ring part 43, the second ring part 135 and first ring part 43, the second ring part 135 and second ring part 44, the third ring part 136 and second ring part 44, the third ring part 136 and third ring part 45, and the fourth ring part 137 and third ring 45. The magnetic pole parts become six poles. The number of the magnetic pole parts corresponds to the number of locations at which the magnetic flux cuts across the air gap AG between the rotor 1 and armature 4 (FIG. 2) in the axial direction (front-back direction), that is, the number of poles.

As shown in FIG. 1, the hub 5 has a ring-shaped outer hub 51 which is joined by rivets 5a to the front end face of the armature 4, a ring-shaped inner hub 52 which is arranged at an inside of the outer hub 51 in the radial direction, and a ring-shaped elastic member (for example rubber member) 53 which is provided between the outer hub 51 and the inner hub 52. The inner circumferential surface and outer circumferential surface of the elastic member 53 are fastened to the outer circumferential surface of the cylindrical part 52a of the inner hub 52 and the inner circumferential surface of the cylindrical part 51a of the outer hub 51, respectively. The outer hub 51 and the inner hub 52 are integrally joined through the elastic member 53. The inner hub 52 has a cylindrical part 54 which sticks out to the rear.

At the inner circumferential surface of the cylindrical part 54, a shaft (not shown) of a compressor which rotates about the axis L0 is engaged by spline engagement. Rotation of the rotor 1 is transmitted through the armature 4 and hub 5 to the compressor. Note that, the inner hub 52 and the shaft of the compressor are bolted together, but illustration is omitted. The elastic member 53 imparts biasing force forward to the armature 4 so that the armature 4 separates from the rotor 1, but instead of the elastic member 53, it is also possible to use a plate spring which has the same function to configure the hub 5.

In the above configured electromagnetic clutch 100, before the on operation of the electromagnetic clutch 100 is commanded, that is, in the clutch off state, as shown in FIG. 2, the armature 4 displaces forward due to the biasing force of the elastic member 53 (FIG. 1). For this reason, the friction surface 4a of the armature 4 separates from the friction surface 1a of the rotor 1 and a predetermined amount Δg of gap (air gap AG) is formed between the friction surfaces 1a and 4a.

On the other hand, if an on operation of the electromagnetic clutch 100 is commanded in the state where the rotor 1 is rotating, the electromagnetic coil 3 is energized and magnetic flux is generated. As shown by the arrow of FIG. 3, magnetic flux flows through a magnetic circuit from the housing 22 through the rotor 1 and armature 4 to the housing 22. Due to this, an electromagnetic attraction force (electromagnetic force) is generated between the friction surface 1a of the rotor 1 and the friction surface 4a of the armature 4, the armature 4 is pulled to the friction surface 1a against the elastic force of the elastic member 53, and the rotor 1 and armature 4 rotate together.

The present embodiment makes the number of poles of the electromagnetic clutch 100 six poles, so in the clutch on state (state where Δg=0), as shown in FIG. 3, the magnetic flux crosses at the six locations of magnetic pole parts where the rotor 1 and armature 4 face each other. That is, magnetic flux successively flows to the first ring part 134, first ring part 43, second ring part 135, second ring part 44, third ring part 136, third ring part 45, and fourth ring part 137. Such a six-pole structure electromagnetic clutch can give a larger transmission torque than a four-pole structure electromagnetic clutch. Below, this point will be explained.

If using the friction coefficient μ at the friction surfaces 1a and 4a of the rotor 1 and armature 4, the effective radius R of the friction surfaces 1a and 4a, and the electromagnetic attraction force F between the friction surfaces 1a and 4a, in general, the transmission torque T between the rotor 1 and armature 4 is expressed by the following formula (I).

$$T = \mu \cdot F \cdot R \quad (I)$$

Where, the relationship such as shown by the following formula (II) stands between the electromagnetic attraction force F and the number of poles n:

$$F \propto n \cdot \phi^2 / (2 \cdot \mu_0 \cdot S) \quad (II)$$

In the above formula (II), ϕ indicates the magnetic flux at the magnetic pole parts of the rotor 1 and armature 4, $\mu_0$ indicates the magnetic permeability of vacuum, and S indicates the magnetic pole area of the facing parts of the rotor 1 and armature 4 (area per pole).

The effective radius R of the above formula (I) is determined by the inside diameters and outside diameters of the friction surfaces 1a and 4a. If making the effective radii R equal to each other and making the frictional coefficient μ equal to each other between the case of four poles and the case of six poles, the larger the attraction force F, the larger the transmission torque T. On the other hand, between the case of four poles and the case of six poles, in the case of six poles, the number of poles n of the above formula (II) is larger and the magnetic pole area S is smaller. For this reason, if the magnetic fluxes ϕ become equal, in the case of six poles, the electromagnetic attraction force F becomes larger and, as a result, the transmission torque T also becomes greater. In other words, if setting the transmission torque T in the case of six poles equal to the transmission torque T in the case of four poles, in the case of six poles, the magnetic flux ϕ can be made smaller than the case of four poles. Therefore, by making a six pole configuration, the magnetomotive force of the electromagnetic coil 3 in the clutch on state, which is a physical quantity which is determined by multiplication of the coil current and number of coil turns, can be reduced and the amount of power consumption can be kept down.

On the other hand, right after the start of the on operation of the clutch (at the time of input of a clutch on command), there is an air gap AG between the rotor 1 and armature 4. The path of the magnetic flux which crosses the air gap AG becomes longer in the case of six poles than the case of four poles. That is, in the case of six poles, compared with the case of four poles, the number of times the magnetic flux crosses between the rotor 1 and armature 4 is large, so the path becomes longer to that extent. As a result, at the time of a clutch on command, it is not possible to obtain a sufficient operating attraction force for changing the electromagnetic clutch 100 from the off state to the on state. This leads to deterioration of the working performance of the electromagnetic clutch 100.

To avoid this, for example, if making the initial air gap Δg between the rotor 1 and armature 4 smaller, vibration etc. is liable to cause the rotor 1 to contact the armature 4 and a knocking sound to be generated. Therefore, in the present embodiment, the air gap Δg between the rotor 1 and armature 4 is not made smaller. To improve the working performance of the electromagnetic clutch 1, the energization circuit of the electromagnetic coil 3 is configured in the following way.

Figure 4:
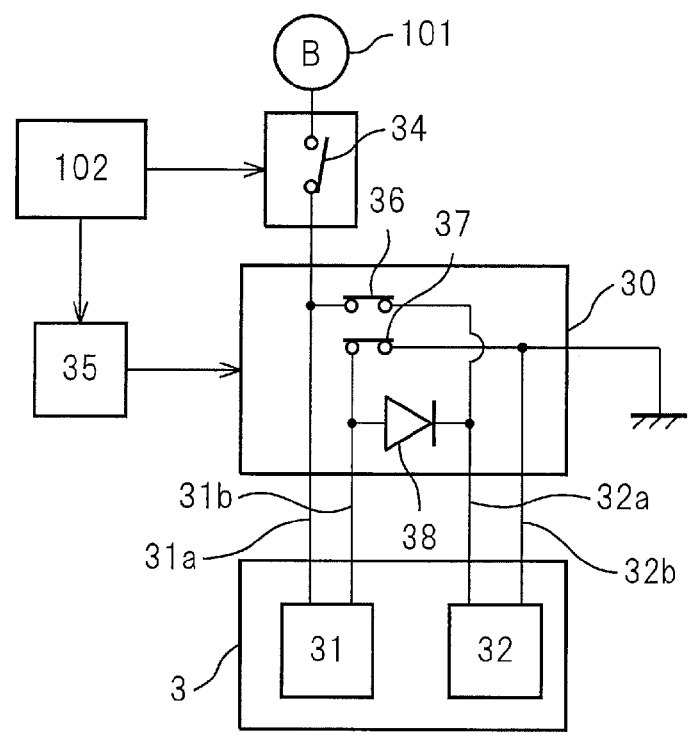
FIG. 4 is a view which shows an energization circuit of the electromagnetic coil of FIG. 1.

FIG. 4 is a view which shows an energization circuit for the electromagnetic coil 3 in the electromagnetic clutch 100 according to the first embodiment. A battery 101 which is mounted in a vehicle is connected through a relay switch 34 to a control circuit 30. Through the control circuit 30, the first electromagnetic coil 31 and the second electromagnetic coil 32 are energized. The relay switch 34 turns on (closes) or off (opens) by a signal from an air-conditioning use control controller 102.

An air-conditioning use control controller 102 judges if operation of the various types of operating switches in the passenger compartment relating to air-conditioning control (for example, air-conditioning on switch, air-conditioning off switch, defroster switch, etc.) or operation of the compressor are required in accordance with the passenger compartment temperature, temperature setting, etc. If judging that operation of the compressor is necessary, a clutch on command is output and the relay switch 34 is turned on. Due to this, the electromagnetic coil 3 is energized. On the other hand, if judging that operation of the compressor is not necessary, a clutch off command is output and the relay switch 34 is turned off. Due to this, energization of the electromagnetic coil 3 is stopped.

The control circuit 30 includes a first switch 36, second switch 37, and diode 38. The first switch 36 is interposed between the plus side end part (lead wire 31a) of the coil wire 3a of the first electromagnetic coil 31 and the plus side end part (lead wire 32a) of the coil wire 3a of the second electromagnetic coil 32. The second switch 37 is interposed between the minus side end part (lead wire 31b) of the coil wire 3a of the first electromagnetic coil 31 and the minus side end part (lead wire 32b) of the coil wire 3a of the second electromagnetic coil 32. The diode 38 is connected between the lead wire 31b at the first electromagnetic coil 31 side from the second switch 37 and the lead wire 32a of the second electromagnetic coil 32 side from the first switch 36. The diode 38 permits the flow of current from the lead wire 31b of the first electromagnetic coil 31 to the lead wire 32a of the second electromagnetic coil 32 and prohibits the flow of current in the opposite direction.

The first switch 36 and second switch 37 are, for example, comprised of FETs (field effect transistors) or other semiconductor devices. The first switch 36 and second switch 37 operate by signals from the control part 35. That is, the first switch 36 and the second switch 37 close until an on signal is input from the control part 35, open when an on signal is output from the control part 35, and close when an off signal is output from the control part 35 (when output of an on signal is stopped).

The control part 35 has a timer and starts the timer when a clutch on command is output from the control controller 102. After that, when the timer counts a preset predetermined time t1, the control part 35 outputs on signals to the switches 36 and 37 and resets the timer. The predetermined time t1 is set to the time which is required from when a clutch on command is output to when the armature 4 is attracted to the rotor 1 (for example, about 0.5 second). This predetermined time t1 is set considering the time which is required after a clutch on command to when the relay switch 34 turns on and the electromagnetic coil 3 generates a magnetic flux and the time which is required for the electromagnetic attraction force to cause the armature 4 to move by a predetermined amount Δg. If a clutch off command is output from the control controller 102, the control part 35 outputs an off signal.

Figure 7:
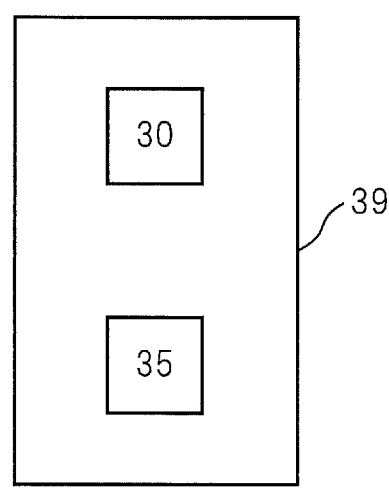
FIG. 7 is a view which shows the configurations of the control circuit and the control part of FIG. 4.

The above control circuit 30 and control part 35 may be provided at a control controller 102 which is separate from the stator 2. For example, the control circuit 30 and the control part 35 are integrated at a single chip member 39 such as shown in FIG. 7 and configured as an integrated circuit (IC chip) which is then mounted on a board of the control controller 102. Note that the control circuit 30 and the control part 35 need not be configured as an integrated circuit. An electronic unit which contains these may be attached to the stator 2.

Figure 5:
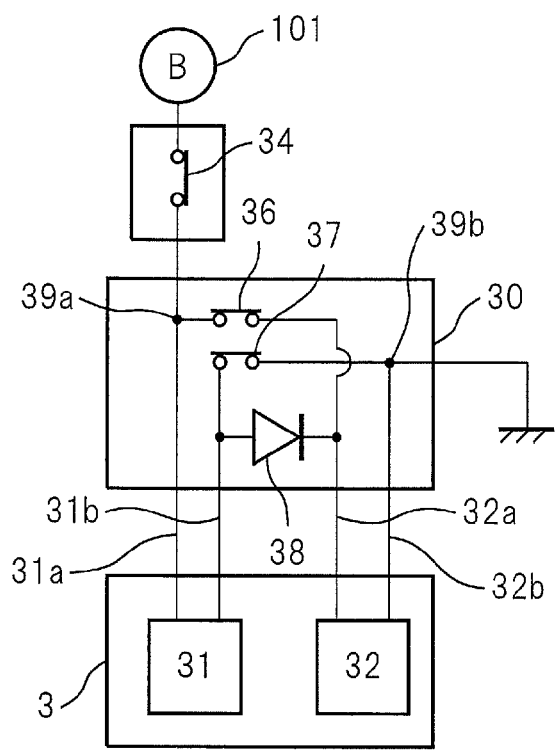
FIG. 5 is a view which shows an operation of the energization circuit of FIG. 4.

The characteristic operation of the electromagnetic clutch 100 according to the first embodiment will be explained. Before a clutch on command is output from the control controller 102, as shown in FIG. 4, the relay switch 34 is off. Therefore, the energization circuit of the electromagnetic coil 3 is cut off from the battery 101 and the electromagnetic coil 3 becomes deenergized in state. If a clutch on command is output, as shown in FIG. 5, the relay switch 34 is on. Right after a clutch on command is output, the first switch 36 and second switch 37 of the control circuit 30 remain closed. Therefore, the first electromagnetic coil 31 and the second electromagnetic coil 32 are connected in parallel with each other through the first switch 36 and second switch 37.

Due to this, the current from the battery 101 is branched at a branch point 39a. Currents flow in parallel to the first electromagnetic coil 31 and second electromagnetic coil 32, then merge at a merging point 39b. That is, the currents which are branched at the branch point 39a flow through the coil wire 31a, first electromagnetic coil 31, coil wire 31b, and second switch 37 and flow through the first switch 36, coil wire 32a, second electromagnetic coil 32, and coil wire 32b. In this case, the control circuit 30 is provided with the diode 38, so the flow of current from the lead wire 32a to the lead wire 31b is blocked.

In this way, right after the clutch on command, the first electromagnetic coil 31 and the second electromagnetic coil 32 are connected in parallel, the combined resistance of the coils 31 and 32 as a whole becomes smaller, and the current which flows through the coils 31 and 32 increase. For this reason, the magnetomotive force which is generated at the electromagnetic coil 3 becomes larger the electromagnetic attraction force between the rotor 1 and armature 4 increases, and the working performance of the electromagnetic clutch 100 at the time when the electromagnetic clutch 100 changes from the off state to the on state can be improved.

Figure 6:
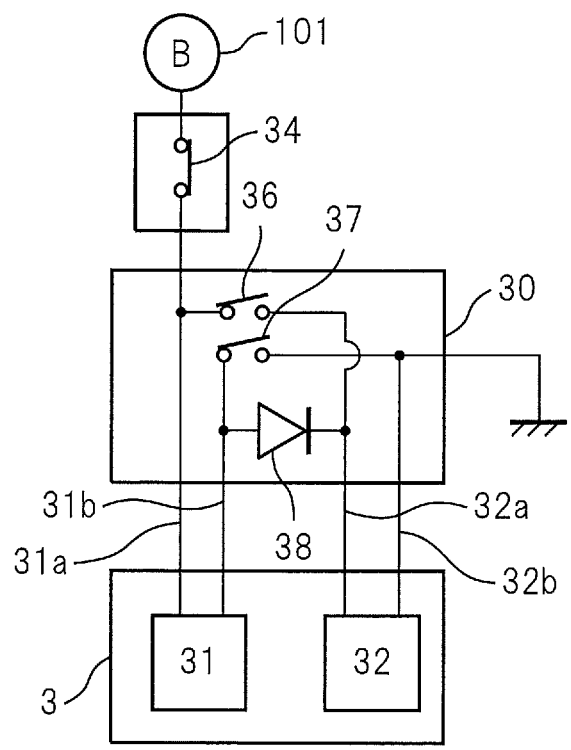
FIG. 6 is a view which shows another operation of the energization circuit of FIG. 4.

If the predetermined time t1 elapses from when a clutch on command is output, the control part 35 outputs on signals to the first switch 36 and second switch 37. Due to this, as shown in FIG. 6, the switches 36 and 37 open and the first electromagnetic coil 31 and second electromagnetic coil 32 are connected with each other in series. As a result, current from the battery 101 successively flows through the lead wire 31a, first electromagnetic coil 31, lead wire 31b, diode 38, lead wire 32a, second electromagnetic coil 32, and lead wire 32b. In this state, the circuit resistance increases compared with the case of parallel connection of FIG. 5, so the current which flows through the electromagnetic coils 31 and 32 decreases. Due to this, the consumed power in the clutch on state can be decreased. This contributes to improvement of the fuel economy.

Note that, in the present embodiment the electromagnetic coils are connected in parallel for exactly the predetermined time t1 when shifting from the clutch off state to on state, so during that time, the consumed power increases. However, the predetermined time t1 is the time which is required for the armature 4 to be attracted to the rotor 1 and is extremely short, so deterioration of the fuel economy is not a problem. In the clutch on state, the electromagnetic coils are connected in series, so compared with parallel connection, the magnetomotive force due to the electromagnetic coil 3 decreases, but in this state, the air gap AG already has become 0, so a sufficient transmission torque T can be obtained.

According to the first embodiment, the following such actions and effects can be exhibited:

(1) If configuring the electromagnetic coil 3 by the first electromagnetic coil 31 and the second electromagnetic coil 32 and having the control controller 102 output a clutch on command, the energization of the electromagnetic coil 3 is started and the control circuit 30 is switched at a predetermined timing by a signal from the control part 35. That is, when a clutch on command is output from the control part 35, the first electromagnetic coil 31 and the second electromagnetic coil 32 are connected in parallel and, after the elapse of a predetermined time t1, the first electromagnetic coil 31 and the second electromagnetic coil 32 are connected in series. Due to this, right after the clutch on command, the combined resistance of the electromagnetic coil 3 is small, so the magnetomotive force which is generated at the electromagnetic coil 3 becomes larger. For this reason, the electromagnetic attraction force between the rotor 1 and armature 4 is increased and the working performance of the electromagnetic clutch 100 when the electromagnetic clutch 100 changes from the off state to the on state can be improved.

After the armature 4 is attracted to the rotor 1 (clutch on state), the air gap Δg is 0, so a large electromagnetic attraction force is not required for transmitting torque from the rotor 1 to the armature 4. In the present embodiment, the time which is required for the armature 4 to be attracted to the rotor 1 from the start of energization of the electromagnetic coil 100 is set in advance as the predetermined time t1 and the first electromagnetic coil 31 and the second electromagnetic coil 32 are made to be connected in series after the elapse of the predetermined time t1. Due to this, it is possible to prevent a larger than necessary current from flowing to the electromagnetic coil 3 and to secure good working performance of the electromagnetic clutch 100 while keeping down the consumed power of the electromagnetic coil 3.

(2) The control circuit 30 is provided with a first switch 36 and second switch 37, the switches 36 and 37 are switched by signals from the control part 35 after a predetermined time t1 from output of a clutch on command, and the control circuit 30 is switched from a parallel circuit to a serial circuit. Such a control circuit 30 and control part 35 can, for example, be configured as an IC chip 39 (FIG. 7) and can be easily assembled in the control controller 102.

(3) The control circuit 30 is provided with a first switch 36 and second switch 37 and with a diode 38, so the parallel circuit and the serial circuit can be easily switched.

(4) The transmission torque which is required between the rotor 1 and armature 4 in the clutch on state where the air gap Δg is 0 is made Ta. The present embodiment makes the number of poles of the electromagnetic clutch 100 six poles, so the magnetomotive force for obtaining the required transmission torque Ta can be reduced from an electromagnetic clutch with, for example, a number of poles of four poles. The consumed power can be decreased by that extent.

Further, in the case of six poles, compared with the case of four poles, the amount of magnetic flux which passes through the magnetic circuit which is required for obtaining the necessary transmission torque Ta may be reduced. For this reason, it is possible to reduce the thickness of the magnetic material which forms the magnetic circuit (iron parts) and lighten the weight of the electromagnetic clutch 100.

(5) The cylindrical shape first electromagnetic coil 31 and second electromagnetic coil 32 are used to form the electromagnetic coil 3, and the second electromagnetic coil 32 is arranged on the same axis as the first electromagnetic coil 31 and at the outside of the first electromagnetic coil 31 in the radial direction. Therefore, the back end faces of the electromagnetic coils 31 and 32 may be arranged facing the through hole 22a of the back end part of the housing 22. The two end parts of the coil wires 3a of the electromagnetic coils 31 and 32 can be easily taken out to the outside of the housing 22.

Note that, above, the electromagnetic coil 3 is divided into two electromagnetic coils 31 and 32, but may also be divided into three or more coils. These may be connected in parallel and serially. Further, the electromagnetic coils 31 and 32 need not be arranged adjoining each other in the radial direction and may also be arranged adjoining each other in the axial direction.

Figure 8:
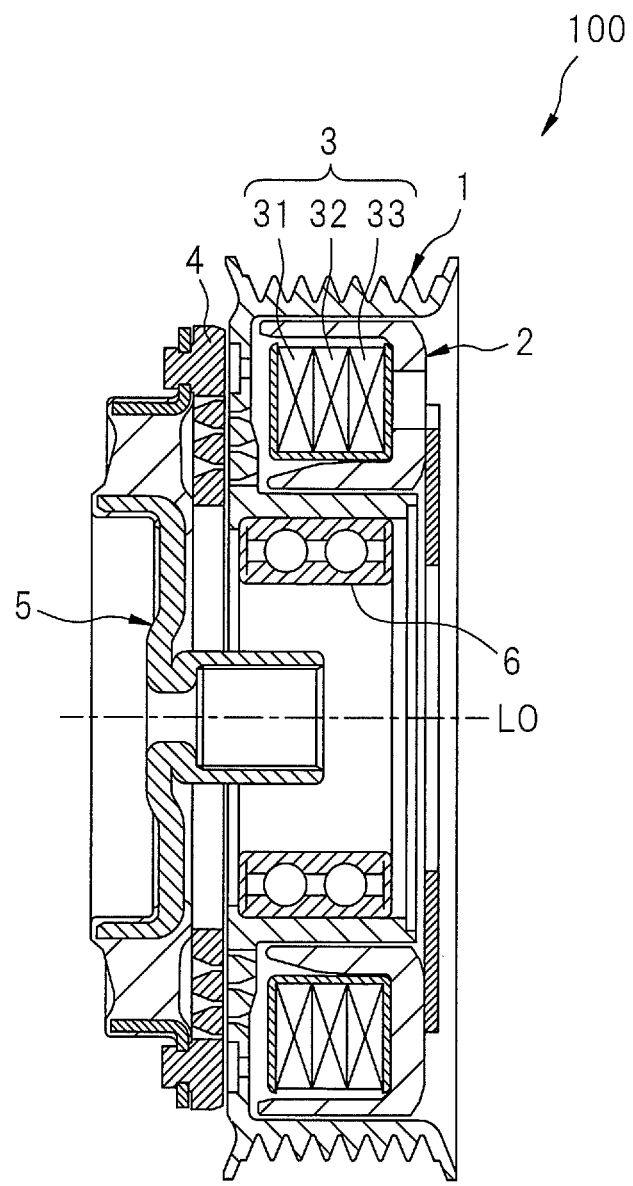
FIG. 8 is a view which shows a modification of FIG. 1.

FIG. 8 is an example of arrangement of three electromagnetic coils 31 to 33 adjoining each other in the axial direction. As shown in FIG. 8, when dividing the electromagnetic coil 3 into three coils, compared with when dividing it to two coils, the combined resistance when connecting the electromagnetic coils 3 in parallel becomes smaller. As a result, the electromagnetic attraction force when a clutch on command is output increases more and the electromagnetic clutch 100 can be further improved in working performance. Further, as shown in FIG. 8, when arranging the electromagnetic coils 31 to 33 in parallel in the axial direction, the electromagnetic coils 31 to 33 can be configured as the same sizes and the electromagnetic coils 31 to 33 can be supplied with equal currents to each other.

Second Embodiment

Referring to FIG. 9 to FIG. 13, a second embodiment of an electromagnetic clutch according to the present invention will be explained. The second embodiment differs from the first embodiment in the configuration of the switch part which switches the energization circuit of the electromagnetic coil 3. That is, in the first embodiment, IC chip 39 which is independent from the stator 2 is provided with switches 36 and 37 and a signal from the control part 35 is used to switch the switches 36 and 37. As opposed to this, in the second embodiment, the stator 2 is provided integrally with a switch part and the electromagnetic attraction force of the electromagnetic coil 3 is used to automatically operate the switches. Note that, the configuration other than the switch part is the same as the first embodiment. Below, the points of difference from the first embodiment will be mainly explained.

Figure 9:
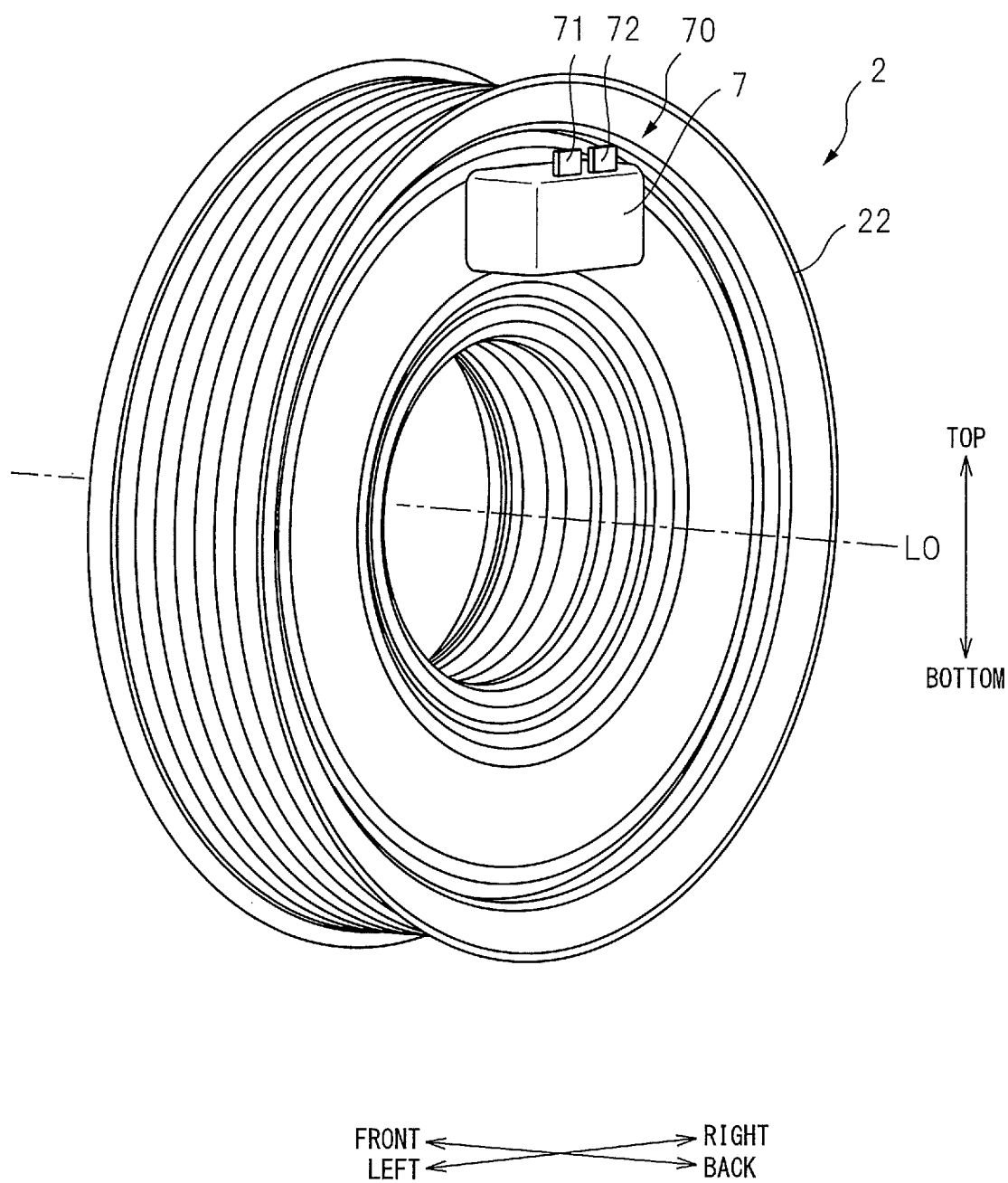
FIG. 9 is a perspective view of a stator which shows the principal configuration of an electromagnetic clutch according to a second embodiment of the present invention.

FIG. 9 is a perspective view of a stator 2 which forms a main part of an electromagnetic clutch 100 according to the second embodiment (view seen from a slant at the back). Note that, for convenience, as illustrated, the direction perpendicular to the front-back direction in the horizontal plane is defined as the "left-right direction" and the direction perpendicular to the front-back direction and left-right direction is defined as the "top-bottom direction". At the back end face of a housing 22, a switch part 70 is provided at a phase of 0° corresponding to the position of the through hole 22*a* of the housing 22. The switch part 70 is covered by a box-shaped cover 7 and has a pair of left and right terminals 71 and 72 which stick out from the top surface of the cover 7.

Figure 10:
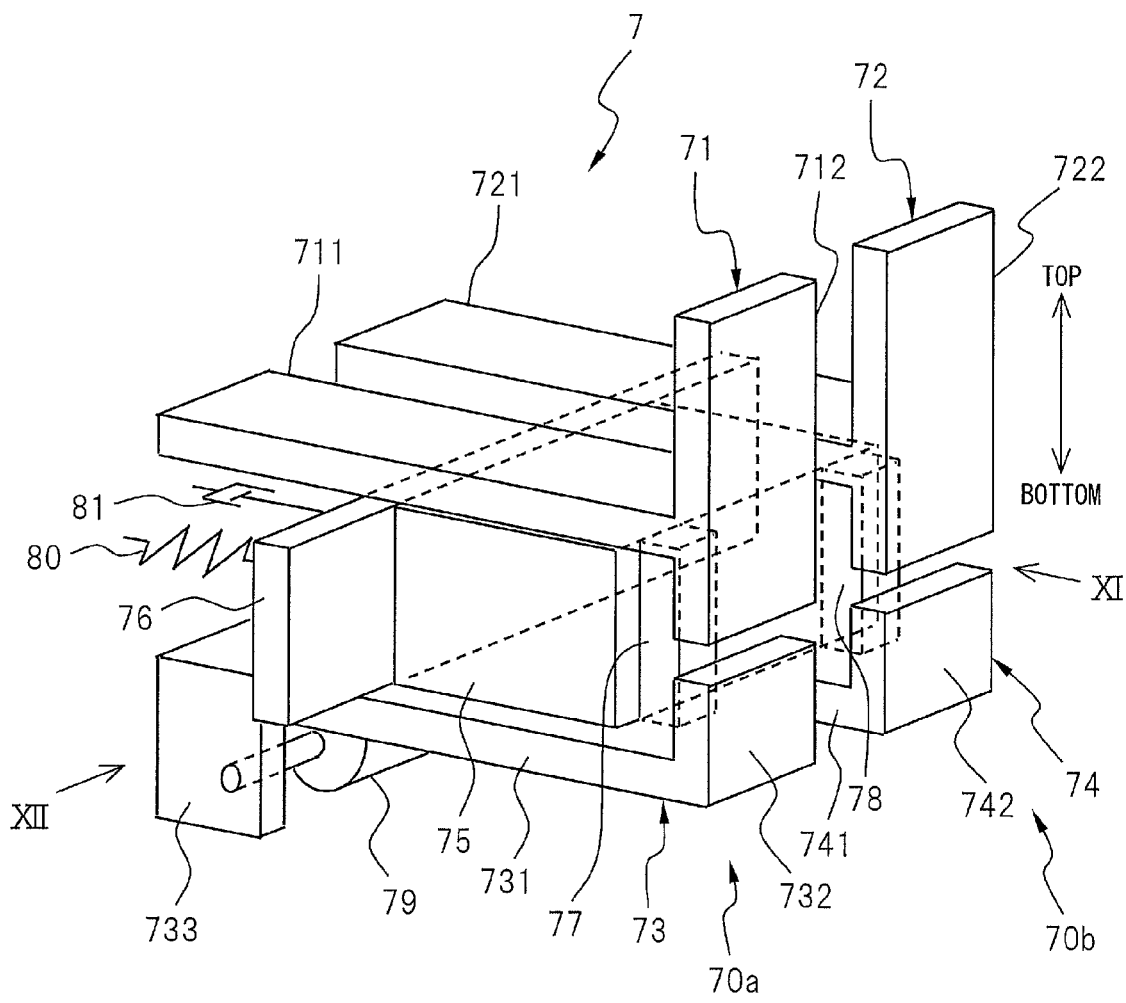
FIG. 10 is a perspective view which shows an internal configuration of a cover of FIG. 9.
Figure 11:
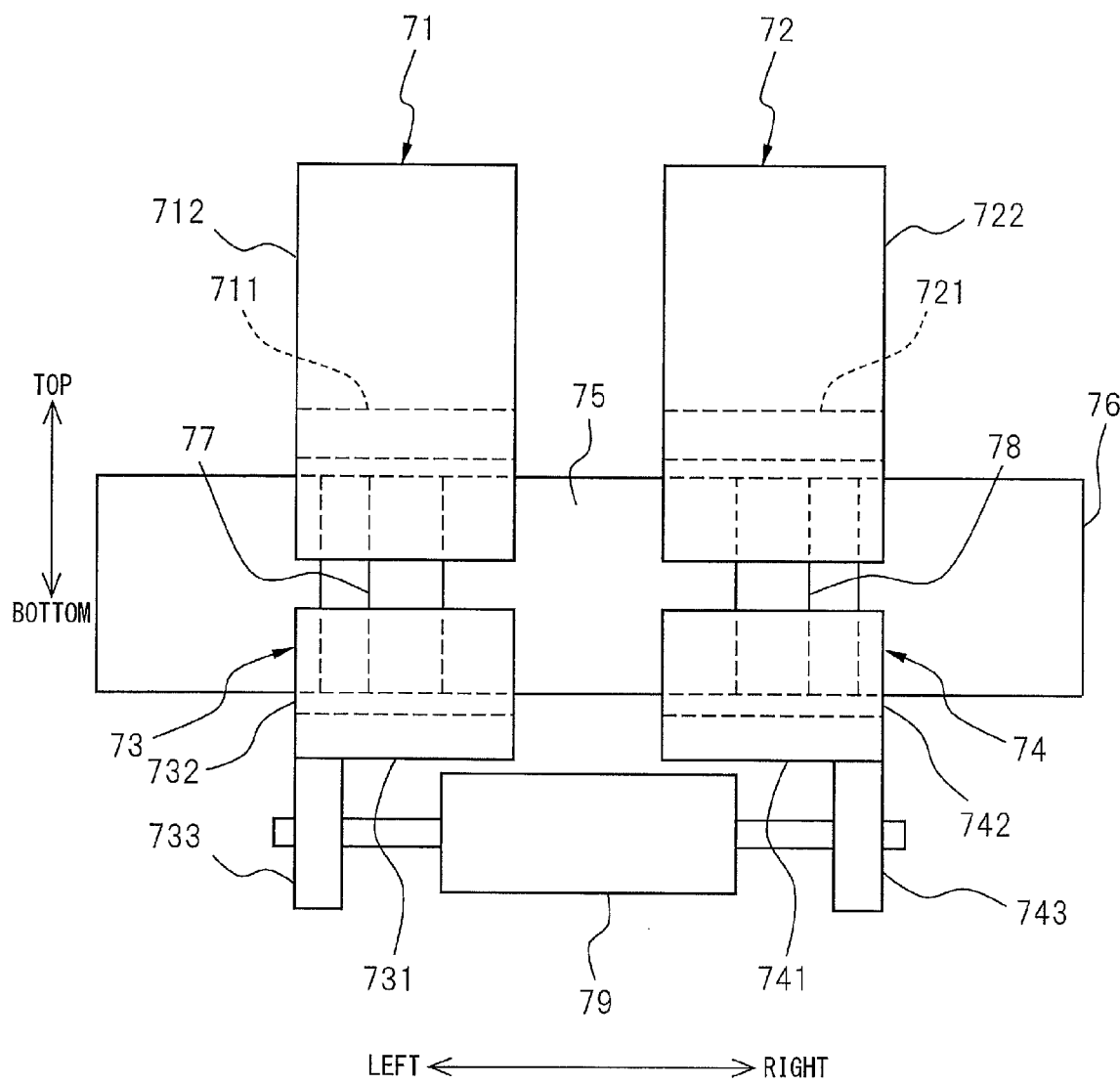
FIG. 11 is a view along an arrow XI of FIG. 10.
Figure 12:
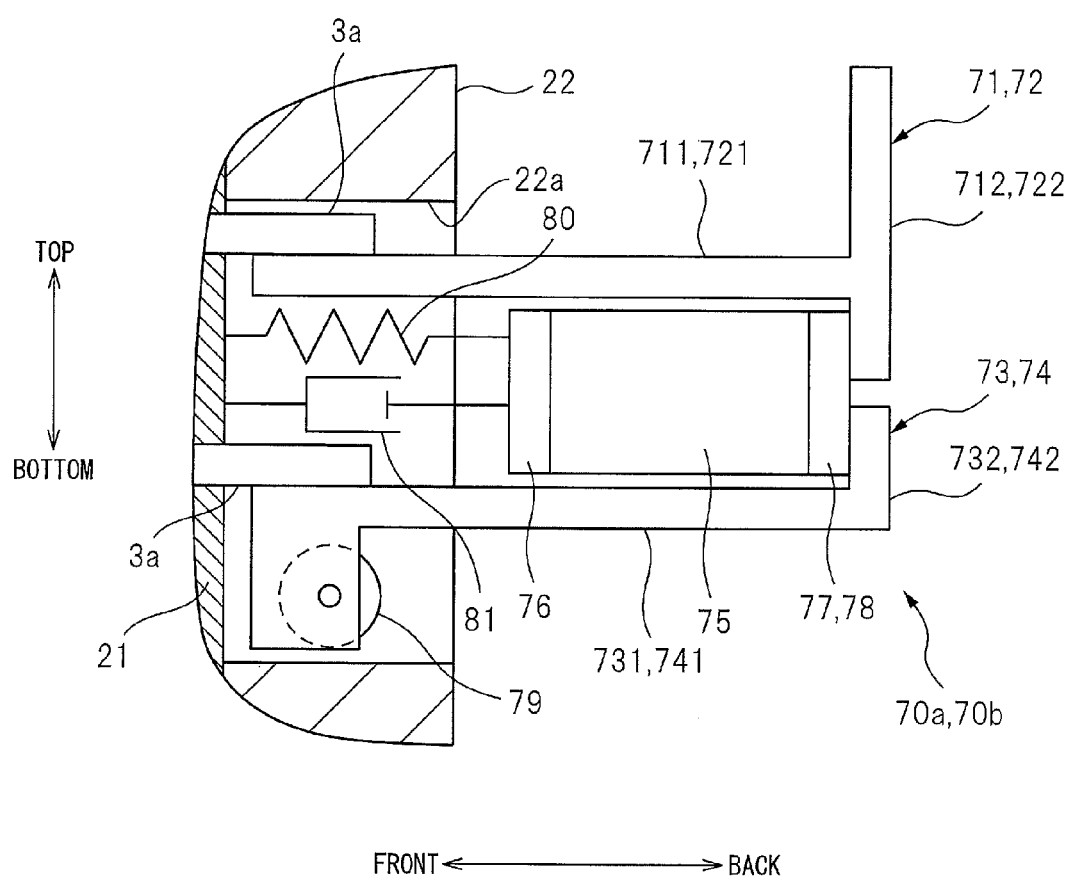
FIG. 12 is a view along an arrow XII of FIG. 10 and shows an electromagnetic clutch off state.

FIG. 10 is a perspective view which shows the configuration of the switch part 70 in the cover 7, FIG. 11 is a view along the arrow XI of FIG. 10 (view seen from rear), and FIG. 12 is a view along the arrow XII of FIG. 10 (view seen from left side). As shown in FIGS. 10 and 11, the terminals 71 and 72 are comprised of copper plates or other conductive members and are arranged separated by a predetermined distance in the left-right direction. The terminals 71 and 72 have flat plate parts 711 and 721 which extend in the front-back direction and flat plate parts 712 and 722 which are fastened to the back end parts of the flat plate parts 711 and 721 and extend in the up-down direction over the top and bottom faces of the flat plate parts 711 and 721. The flat plate parts 711 and 721 are arranged on the same horizontal plane, while the flat plate parts 712 and 722 are arranged on the same vertical plane.

Below the terminals 71 and 72, a pair of left and right terminals 73 and 74 are arranged. The terminals 73 and 74 are configured by copper plates or other conductive members and are arranged separated by a predetermined distance in the left-right direction. The terminals 73 and 74 have flat plate parts 731 and 741 which extend in the front-back direction, flat plate parts 732 and 742 which extend upward from the back end parts of the flat plate parts 731 and 741, and flat plate parts 733 and 743 which extend downward from the left side surface of the front end part of the flat plate part 731 and the right side surface of the front end part of the flat plate part 741. The flat plate parts 731 and 741 are arranged on the same horizontal plane separated from the bottom surfaces of the flat plate parts 711 and 721 of the terminals 71 and 72 by a predetermined distance. The flat plate parts 732 and 742 are arranged on the same vertical plane as the flat plate parts 712 and 722 separated from the bottom end faces of the flat plate parts 712 and 722 of the terminals 71 and 72 by a predetermined distance.

Between the flat plate parts 711 and 721 of the terminals 71 and 72 and the flat plate parts 731 and 741 of the terminal 73 and 74, a spool 75 is arranged to be able to move in the front-back direction. Note that, at the bottom surfaces of the flat plate parts 711 and 721 and the top surfaces of the flat plate parts 731 and 741, not shown guide parts which restrict the direction of movement of the spool 75 are provided. The spool 75 is comprised of a plastic etc. which has an electrical insulating property and overall exhibits a box shape. At the front end face of the spool 75, an attraction plate 76 which extends in the left-right direction over the left and right side faces of the spool 75 is fastened. The attraction plate 76 is configured by iron or another magnetic material.

At the back end face of the spool 75, a pair of left and right contact members 77 and 78 are fastened so as to face the flat plate parts 712 and 732 of the terminals 71 and 73 and the flat plate parts 722 and 742 of the terminals 72 and 74. The contact members 77 and 78 are comprised of copper or other metal which has conductivity and are arranged separated by a predetermined distance in the left-right direction. Between the flat plate part 733 of the terminal 73 and the flat plate part 743 of the terminal 74, a diode 79 is arranged. A pair of lead wires which stick out from the left and right ends of the diode 79 are connected to the flat plate parts 733 and 743.

The diode 79 allows the flow of current from the flat plate part 743 side to the flat plate part 733 side and prohibits the flow of current from the flat plate part 733 side to the flat plate part 743 side.

As shown in FIG. 12, the front end parts of the flat plate parts 711 and 721 of the terminals 71 and 72 are housed in the through hole 22*a* of the housing 22. At the front end parts of the flat plate parts 711 and 721, one end part of the first electromagnetic coil 31 (plus side) and one end part of the second electromagnetic coil 32 (minus side) are connected, respectively. The front end parts of the flat plate parts 731 and 741 of the terminals 73 and 74 are also housed in the through hole 22*a*. At the front end parts of the flat plate parts 731 and 741, the other end part of the second electromagnetic coil 32 (plus side) and the other end part of the first electromagnetic coil 31 (minus side) are connected, respectively.

At the front end face of the attraction plate 76, one end of a spring 80 and one end of a damper member 81 are fastened. The spring 80 and damper member 81 are housed in the through hole 22*a*, while the other end parts are fastened to the back end face of the spool 21 inside of the housing 22. The spring 80 biases the spool 75 backward through the attraction plate 76, while the back end faces of the contact members 77 and 78 abut against the front end faces of the flat plate parts 712 and 732 of the terminals 71 and 73 and the front end faces of the flat plate parts 722 and 742 of the terminals 72 and 74.

While not shown, at the top end part of the flat plate part 712 of the terminal 71, a relay switch 34 is connected through a lead wire, while the top end part of the flat plate part 722 of the terminal 72 is grounded through a lead wire. That is, the terminal 71 corresponds to the lead wire 31*a* of FIG. 4, while the terminal 72 corresponds to the lead wire 32*b*. On the other hand, the flat plate parts 732 and 742 of the terminals 73 and 74 abut against the flat plate parts 712 and 722 of the terminals 71 and 72 through the contact parts 77 and 78, respectively, while the terminals 73 and 74 correspond to the lead wires 32*a* and 31*b* of FIG. 4. In FIG. 10, the terminals 71 to 74 (flat plate parts 712, 722, 732, and 742) are fixed contacts, while the contact members 77 and 78 are movable contacts. The terminals 71 and 73 and the contact member 77 form a switch 70*a*, while the terminals 72 and 74 and the contact member 78 form a switch 70*b*. Note that, the switch 70*a* corresponds to the switch 36 of FIG. 4, while the switch 70*b* corresponds to the switch 37.

The main operation of the electromagnetic clutch 100 according to the second embodiment will be explained. If a clutch on command is output from the air-conditioning unit 102 (FIG. 4), the relay switch 34 turns on and current flows from a battery 101 to the terminal 71. Right after the relay switch 34 is turned on, as shown in FIG. 12, the contact member 77 abuts against the flat plate parts 712 and 732 of the terminals 71 and 73, while the contact member 78 abuts against the flat plate parts 722 and 742 of the terminals 72 and 74. For this reason, a circuit is formed which passes through the terminal 71, first electromagnetic coil 31, terminal 74, contact member 78, and terminal 72 and a circuit is formed which passes through the terminal 71, contact member 77, terminal 73, second electromagnetic coil 32, and terminal 72. Due to this, current flows from the battery 101 in parallel to the first electromagnetic coil 31 and second electromagnetic coil 32 and the magnetomotive force which is generated at the electromagnetic coil 3 becomes larger. As a result, the electromagnetic attraction force between the rotor 1 and armature 4 increases and the electromagnetic clutch 100 can be improved in working performance.

Figure 13:
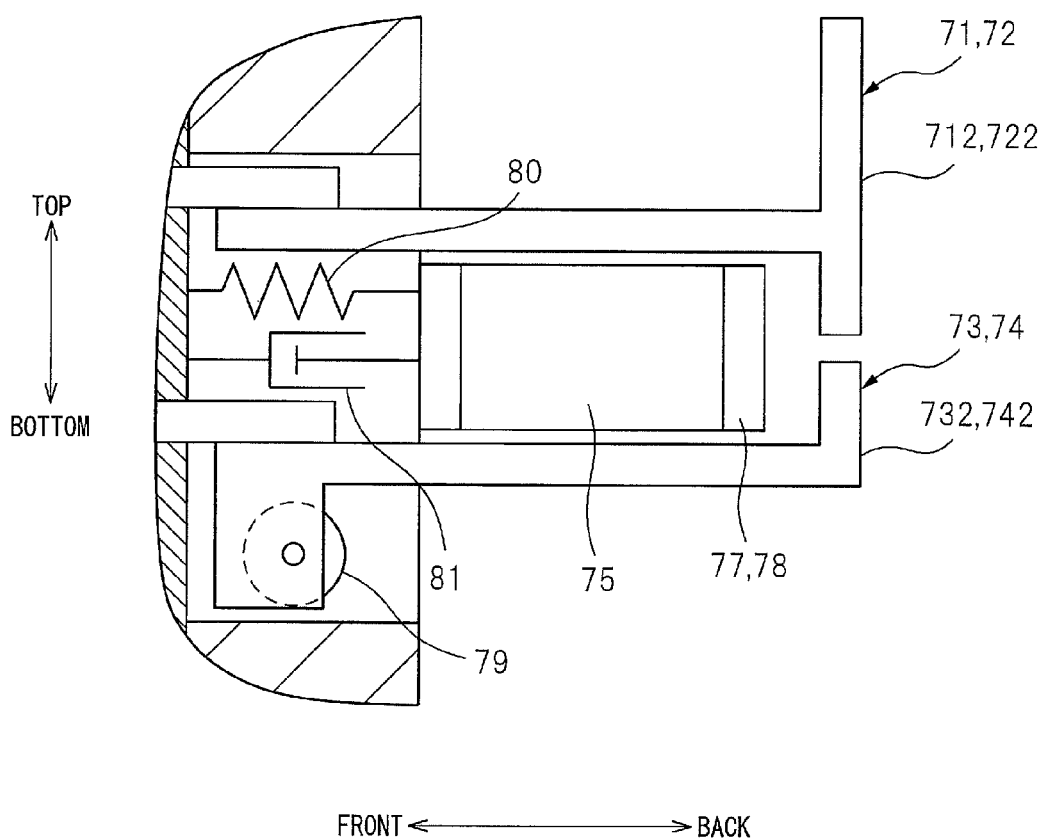
FIG. 13 is a view along an arrow XII of FIG. 12 and shows an electromagnetic clutch off state.

If the relay switch 34 is turned on and thereby the electromagnetic coil 3 is excited, the electromagnetic attraction force of the electromagnetic coil 3 causes the attraction plate 76 to be attracted. Due to this, as shown in FIG. 13, the spool 75 moves forward against the biasing force of the spring 80 and the pair of left and right contact members 77 and 78 separate from the flat plate parts 712 and 732 of the terminals 71 and 73 and the flat plate parts 722 and 742 of the terminals 72 and 74. As a result, the current from the battery 101 successively flows to the terminal 71, first electromagnetic coil 31, terminal 74, diode 79, terminal 73, second electromagnetic coil 32, and terminal 72. That is, current flows serially to the first electromagnetic coil 31 and the second electromagnetic coil 32. Due to this, it is possible to keep down the consumed power of the electromagnetic coil 3 after operation of the electromagnetic clutch 100.

In this case, the damper member 81 acts as a resistor whereby forward movement of the spool 75 is suppressed. For this reason, the spool 75 does not move right after the relay switch 34 is turned on, but moves forward delayed by a predetermined time t2 from when the relay switch 34 turns on. Due to this, the electromagnetic coils 31 and 32 are run through by current in parallel for exactly the predetermined time t2. The predetermined time t2 can be suitably set by adjusting the characteristics (hardness etc.) of the damper member 81. The present embodiment sets the damper member 81 so that the time which is required from when a clutch on command is output to when the armature 4 is attracted to the rotor 1 becomes a predetermined time t2.

Therefore, after the electromagnetic clutch 100 becomes the on state, the energization circuit switches from a parallel to serial mode. For this reason, the electromagnetic coil 3 is never run through by a larger current than necessary. Good working performance of the electromagnetic clutch 100 can be secured while the consumed power of the electromagnetic coil 3 can be decreased. Further, in the second embodiment, since the switch part 70 is covered by the cover 7, the entry of dirt etc. to the inside of the cover 7 can be prevented and stable operation of the switches 70a and 70b can be secured.

MODIFICATIONS

As modifications of the present embodiments, the following ones can be envisaged. In the above first embodiment, after the elapse of a predetermined time t1 from when the clutch on command is output, a signal from the control part 35 causes the switches 36 and 37 to operate. Further, in the above second embodiment, the spring 80 and damper member 81 are interposed in the path of movement of the contact members 77 and 78 so that after the elapse of a predetermined time t2 from when the clutch on command is output, the electromagnetic attraction force which the electromagnetic coil 3 generates causes the switches 70a and 70b to operate. However, if the switch is operated after the elapse of a predetermined time from output of a clutch on command, the switch and switch operating part may be configured in any way.

For example, the switches 36 and 37 and the control part 35 need not be integrated on IC chip 39 and may also be configured by another electronic circuit which has relays, resistors, etc. The contact members 77 and 78 are made to separate from the terminals 71 to 74 to operate the switches 70a and 70b, but conversely the contact members 77 and 78 may also be made to abut against the terminals 71 to 74 to operate the switches 70a and 70b.

In the above embodiments, when a clutch on command is output, current flows in parallel to the electromagnetic coils 31 and 32. After the predetermined times t1 and t2, current flows in series to the electromagnetic coils 31 and 32. However, the circuit switching part is not limited in configuration so long as after the armature 4 is attracted to the rotor 1 (friction plate 13), the energization circuit is switched from a parallel circuit to a serial circuit. For example, it is also possible to provide a detection part which detects if the armature 4 has been attracted to the rotor 1 and possible to operate the switch if the detection part detects attraction of the armature 4. It is also possible to open the switches 36, 37, 70a, and 70b until a clutch on command is output, close the switches 36, 37, 70a, and 70b after the clutch on command is output, then again open the switches 36, 37, 70a, and 70b. That is, the configuration of the energization circuit which energizes the electromagnetic coil 3 is not limited to the above one.

In the above embodiment (FIG. 1), at the outside of the first electromagnetic coil 31 (first coil) in the radial direction, a second electromagnetic coil 32 (second coil) is arranged. Further, in the above embodiment (FIG. 8), the second electromagnetic coil 32 (second coil) is arranged adjoining the first electromagnetic coil 31 (first coil) in the axial direction, but the arrangement of the plurality of electromagnetic coils 3 is not limited to this. In the above embodiment, the number of poles of the electromagnetic clutch 100 is made six poles, but the number of poles may further be made larger than or smaller than six poles. For example, even if the number of poles of the electromagnetic clutch 100 is four poles, it is possible to raise the working performance of the electromagnetic clutch by switching between the parallel circuit and the serial circuit as explained above.

In the above embodiment, the electromagnetic clutch 100 is applied to a compressor of an automotive air-conditioning system, but the electromagnetic clutch of the present invention can be similarly applied to another rotary device. Therefore, rather than use the drive force from the engine to drive the rotor 1, it is also possible to use another rotary drive source (for example, motor) to drive the rotor 1. Further, the driven side equipment to which the rotary force is transmitted through the electromagnetic clutch 100 may be equipment other than a compressor as well.

The above explanation is in the end only one example. Insofar as not impairing the features of the present invention, the present invention is not limited by the above-mentioned embodiments and modifications. The above embodiments and modifications include ones which maintain identity of the invention while enabling possible substitutions and self evident substitutions. That is, other conceivable modes in the scope of the technical idea of the present invention are included in the present invention. Further, it is also possible to freely combine two or more of the above embodiments and modifications.

REFERENCE SIGNS LIST 1 rotor
2 stator
3 electromagnetic coil
4 armature
13 friction plate
30 control circuit
31 first electromagnetic coil
32 second electromagnetic coil
35 control part 70 switch part
100 electromagnetic clutch

The invention claimed is:

1. An electromagnetic clutch comprising:
a rotor having a friction surface on the rotor and which rotates about an axis;
a stator having an electromagnetic coil which is energized and deenergized by a clutch on command and clutch off command;
an armature which is attracted to the friction surface by an electromagnetic attraction force generated by energization of the electromagnetic coil,
wherein said electromagnetic coil includes a plurality of electromagnetic coils;
six or more magnetic pole parts between said rotor and said armature; and
a circuit switching part for switching an energization circuit to the electromagnetic coil from a parallel circuit to a serial circuit so that when the clutch on command is output, current flows in parallel to the plurality of electromagnetic coils and then later when the armature is attracted to the friction surface, current flows in series to the plurality of electromagnetic coils,
said circuit switching part comprising switches for switching said energization circuit from said parallel circuit to said serial circuit and a switch operating part which operates said switches after the elapse of a predetermined time from when said clutch on command is output, wherein:
said switches have fixed contacts attached to an end part of said stator and connected to said electromagnetic coils, and movable contacts which abut against or separate from said fixed contacts due to the electromagnetic attraction force generated due to energization of said electromagnetic coil; and
said switch operating part has a damper member which suppresses movement of said movable contacts by said electromagnetic attraction force.

2. The electromagnetic clutch according to claim 1, wherein said switches and said switch operating part are configured by an electronic circuit.

3. The electromagnetic clutch according to claim 1, wherein said circuit switching part has said switches and a diode which forms said parallel circuit or said serial circuit.

4. The electromagnetic clutch according to claim 1, wherein said plurality of electromagnetic coils comprise
a cylindrical shape first coil centered about said axis and
a cylindrical shape second coil arranged at the outside of said first coil in the radial direction and centered about said axis.

5. The electromagnetic clutch according to claim 1, wherein said plurality of electromagnetic coils comprise
a cylindrical shape first coil centered about said axis and
a cylindrical shape second coil arranged adjoining said first coil in the direction of said axis and which is centered about said axis.

* * * * *